United States Patent [19]

Mori et al.

[11] Patent Number: 5,016,029

[45] Date of Patent: May 14, 1991

[54] PRINTER

[75] Inventors: Seiichi Mori, Fujisawa; Masatoshi Takano, Tokyo; Kazuhiro Ichinokawa, Kawagoe, all of Japan

[73] Assignee: Asahi Kogaku Kogyo Kabushiki Kaisha, Tokyo, Japan

[21] Appl. No.: 421,060

[22] Filed: Oct. 13, 1989

[30] Foreign Application Priority Data

Oct. 17, 1988 [JP] Japan .......................... 63-135252[U]

[51] Int. Cl.[5] ...................... G01D 15/14; G03G 21/00

[52] U.S. Cl. .................................... 346/160; 355/311

[58] Field of Search .................. 346/153.1, 160, 160.1; 358/300; 355/319, 311

[56] References Cited

U.S. PATENT DOCUMENTS

| | | | |
|---|---|---|---|
| 3,697,170 | 10/1972 | Bhagat et al. | 355/17 |
| 4,204,731 | 5/1980 | Kohler et al. | 355/16 |
| 4,348,101 | 9/1982 | Schonfeld et al. | 355/319 |
| 4,518,975 | 5/1985 | Kawahara et al. | 346/153.1 |
| 4,789,876 | 12/1988 | Miyai et al. | 346/153.1 |

FOREIGN PATENT DOCUMENTS

| | | |
|---|---|---|
| 63-33157 | 3/1988 | Japan . |
| 63-33158 | 3/1988 | Japan . |
| 63-33159 | 3/1988 | Japan . |
| 63-142364 | 6/1988 | Japan . |
| 63-146854 | 9/1988 | Japan . |
| 64-11267 | 1/1989 | Japan . |

OTHER PUBLICATIONS

English Abstract of Japanese Application No. 63-142364.

*Primary Examiner*—Donald A. Griffin

*Attorney, Agent, or Firm*—Sandler, Greenblum & Bernstein

[57] ABSTRACT

In a printer such as a laser beam printer utilized to print an image on a recording medium, an image transferring mechanism such as a photoconductive drum is disposed under the feed path of the recording medium so as to transfer an image such as a toner image onto the undersurface of the recording medium. The recording medium, on which the image is thus transferred is discharged and stacked with the image carrying side down in the proper order.

10 Claims, 2 Drawing Sheets

PRINTER

BACKGROUND OF THE INVENTION

This invention relates to a printer such as a laser beam printer.

An image recording device is known, which utilizes an electrophotographic system in which a surface of a photoconductive drum is exposed to light to form a latent image on the drum surface. Toner is then applied to the latent image to develop the image, and the developed image is transferred onto a recording sheet and is fixed by a fixing unit. Such an image recording device is chiefly employed in a copying machine. In recent years, however, the image recording device is being utilized in a printer or the like, for printing output from a computer. One such printer is a laser beam printer.

The laser beam printer comprises, for example as illustrated in FIG. 1, a photoconductive drum 1. Arranged about the photoconductive drum 1 in due order in a rotational direction thereof are a charging station A, an exposure station B, a developing station C, a transferring station D, a toner-cleaning station E, and a discharge station F.

The arrangement is such that at the exposure station B, the laser beam scans the surface of the drum 1 which has been uniformly charged at the charging station A, to thereby form a latent image on the charged drum surface. Toner is then applied at the developing station C to the latent image to develop the same. Subsequently, the developed toner image is transferred, at transfer station D onto the recording sheet P, which travels at a velocity identical with the circumferential speed of photoconductive drum 1.

The recording sheet P carrying the toner image transferred thereon at the transfer station D is guided and/or fed by guide rollers to fixing station G. The recording paper P is then heated and/or pressed at fixing station G for the toner image to be fixed on the surface of the recording sheet P.

The constitution of the laser beam printer is principally similar to that of an electronic copying machine except for the exposure station. Actually, principal parts of the electronic copying machine are often commonly used for conventional laser beam printers.

The electronic copying machine is designed so that an image-carrying surface can instantly be viewed by transferring the toner image onto the upper surface of the recording sheet and discharging the recording sheet with the image-carrying side up (so-called "faceup exhausting"). This naturally results in the fact that the faceup discharging system is employed in the laser beam printer having the principal parts in common with the electronic copying machine.

However, printers are normally used to print onto sheets on a continuous baises and, if the sheets are discharged with the image-carrying surfaces up, they will be stacked in inverted order of pages.

What has been heretofore proposed to overcome the above defect is that the recording sheet is turned upside down before being discharged by guiding the recording sheet along a sheet discharge path extending from the fixing station, inside the printer, to the same side as the sheet introduction side.

However, with the aforementioned arrangement, the recording sheet feed path inside the printer becomes long and complicated, which causes jamming and other similar problems. Further, the printer tends to become large-sized.

SUMMARY OF THE INVENTION

It is therefore an object of the invention to provide a printer capable of discharging recording sheets in face-down condition so as to stack them in the proper order of pages, which is free from increased troubles such as paper-jamming as well as increase in size.

Another object of the invention is to provide a printer which is excellent in operability, i.e. capable of being operated totally from one side of the printer.

In order to accomplish the foregoing objects, according to the present invention, there is provided a printer wherein an image is printed on a cut-sheet type recording medium, which comprises:

feed means for feeding the recording medium one by one along a predetermined feed path;

image form means disposed under the feed path for forming the image onto the undersurface of the recording medium fed by the feed means; and discharge means for discharging and stacking the recording medium with the image carrying surface down.

DESCRIPTION OF THE ACCOMPANYING DRAWINGS

FIG. 1 is a schematic side view illustrating the system configuration of a conventional laser beam printer; and FIG. 2 is a schematic side view illustrating a laser beam printer embodying the presnet invention.

DESCRIPTION OF THE EMBODIMENTS

Figure 1:
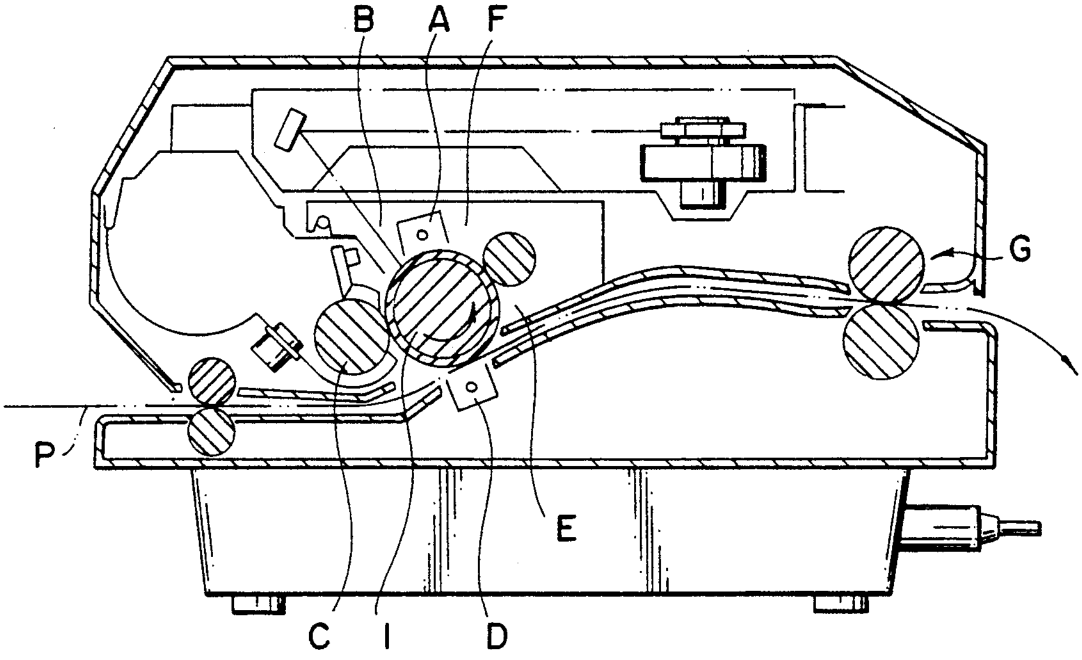
Fig. 1 PRIOR ART
Figure 2:
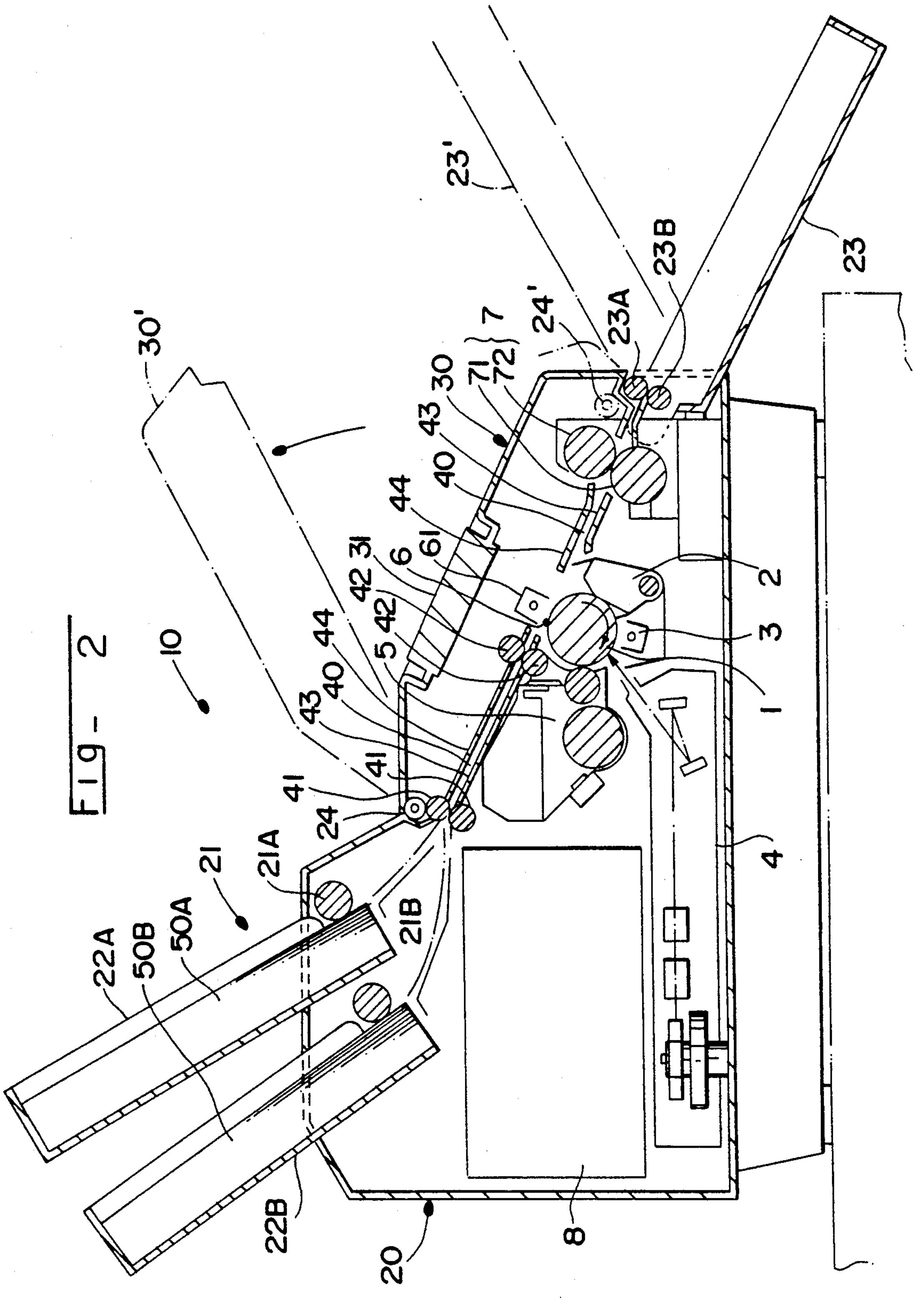

FIG. 2 is a schematic side view illustrating a laser beam printer such as an electrophotographic printer, embodying the present invention. This printer is a so-called page printer in which cut-sheets which are cut into predetermined sizes are used.

The laser beam printer 10 shown in FIG. 2 looks like a rectangular parallelepiped with its top diagonally cut at a predetermined angle and consists of a body 20 and a clamshell 30.

The uppermost section of the body 20 forms a cassette holding portion 21 to receive a pair of paper cassettes 22A, 22B in which papers of different size are respectively stored.

A pair of paper guide roller 21A, 21B are provided at the cassette holding portion 21, each of which is biased so as to press the recording paper accommodated in the corresponding paper cassette 22A/22B when the paper cassette 22A/22B is fitted to the cassette holding portion 21. While printing is being executed, recording paper is sequentially introduced one by one into a paper feed path 40, which will be described later, as the selected one of the guide rollers 21A, 21B rotates.

A discharge paper tray 23 is provided at the side of the body 20 diagonally to the cassette holding portion 21.

The paper discharge tray 23 is capable of rocking vertically at a predetermined angle and also being fixed at any given angle (as shown 23'). A pair of rollers 23A, 23B which are vertically opposed to each other are disposed at the base end of the paper tray 23. The pair of rollers 23A, 23B are rotationally to feed and guide the recording paper 50A/50B along the paper feed path 40 toward the discharge paper holder 23.

The clamshell 30 forms an inclined surface portion of the printer 10 and its upper end portion is rockably coupled to the body 20 by means of a pivot shaft 24. Thus, the lower end portion of the clamshell 30 is allowed to rock away from the body 20 with the shaft 24 as a fulcrum so that the clamshell 30 is able to open as shown by an imaginary line 30' in FIG. 2. A control panel 31 for operating the printer 10 is disposed on the inclined surface of the clamshell 30. An upper cover plate 43 of the body 20 and a lower cover plate 44 of the clamshell 30 define therebetween the paper feed path 40 when the clamshell 30 is closed with respect to the body 20. The clamshell 30 has substantially uniform thickness and the paper feed path 40 is directed downward at substantially the same inclination angle as that of the inclined surface of the clamshell 30.

A pair of opposed timing rollers 41 and feed rollers 42 are respectively provided on the cover plates 43, 44, one of each of which is driven to rotate by a drive means, not shown.

A photoconductive drum 1 is disposed under the substantially central area of the paper feed path 40 in the body 20.

Around the photoconductive drum 1 in the body 20, the following units are disposed along the direction of its rotation in the order described below: a cleaning unit 2 for removing toner remaining on the surface of the drum 1, a charging unit 3 for uniformly charging the surface of the drum 1, an optical scanning system 4 for scanning the charged surface of the drum 1 with a laser beam carrying image data to form a latent image thereon, and a developing unit 5 for dispensing toner onto the portion of the surface of the drum 1 exposed to the laser beams to develop a toner image. A reference numeral 8 represents a control unit for controlling the operation of the printer 10 and includes a power source.

On the other hand, a corona charger 61 for charging the recording paper 50A/50B so that the toner image on the drum 1 is transferred thereonto is disposed is the clamshell 30 in opposed relation to the drum 1 with the paper feed path 40 therebetween. The corona charger 61 and the portion of the drum 1 opposed thereto constitute a transfer unit 6.

The photoconductive drum 1 and the developing unit 5 are so-called consumable components and should be exchanged after being used for a certain period of time. For this reason, these component parts are formed to be independently replaceable units, and disposed removably if the clamshell 30 is rocked upwardly. In other words, the consumable components such as the photoconductive drum 1 and the developing unit 5 which must be exchanged at certain-time intervals can readily be replaced since the clamshell 30 is arranged to be upwardly openable.

These exchangeable components may be arranged to be seated in their respective positions by downward closure of the clamshell 30. More specifically, instead of employing securing members for the exchangeable components, contacting portions formed at the lower cover plate 44 of the clamshell 30, may be used to press down the core bars of the drum 1 at both lateral ends and/or the upper surface of the developing unit 5 in order to prevent these components from lifting out of their respective positions and from changing their relative positions as the drum 1 and the developing drum in the developing unit 5 are rotated. With this arrangement, securing members for respective components can be dispensed with, whereby not only cost reduction but also convenience in maintenance can be attained.

A fixing unit 7 is arranged down stream of the transfer unit 6 along the paper feed path 40. The fixing unit 7 comprises a heat roll 71 and a backup roll 72 which are opposedly disposed and define the paper feed path 40 therebetween. The recording paper 50A/50B carrying the unfixed toner image is nipped between the rolls 71, 72 and the toner is fixed onto the recording paper 50A/50B by heat and pressure applied by the heat roll 71. A drive motor, not shown, is employed to rotate the heat roll 71 to feed the recording paper 50A/50B in the fixing unit 7.

The laser beam printer thus constructed operates as follows:

The recording paper 50A/50B stored in any one of the paper cassettes 22A and 22B which are fitted to the cassette holding portion 21 of the body 20 are drawn out thereof one by one by the corresponding paper guide roller 21B and advanced into the paper feed path 40. The recording paper 50A/50B thus introduced into the paper feed path 40 is fed by the rollers 41, 42. The toner image formed on the surface of the photoconductive drum 1 is transferred to the undersurface of the recording paper 50A/50B at the transfer unit 6. The toner image transferred onto the undersurface of the recording paper 50A/50B is fixed by the fixing unit 7, and the recording paper 50A/50B is then discharged onto the paper tray 23 with its image-carrying side down (i.e. in a facedown state).

Accordingly, with the above described printer, a series of sheets can be printed in the proper order of pages, and nevertheless the length of the paper feed path does not differ from that of the conventional printer.

Moreover, as the paper feed path is directed from the upper area of one side of the printer diagonally downwardly to the lower area of the other side of the printer with the various component units disposed along that paper feed path, the printer can be made simpler than the conventional printes. Further, as the above printer is constituted such that it can be operated totally from one side, it can be placed in a relatively small space.

On the other hand, in the above described printer, when the clamshell 30 is opened with respect to the body 20, the paper feed path can be fully checked, which facilitates operation in case trouble such as paper-jamming occurs, and further makes the maintenance work easy.

In the above printer, the clamshell 30 is arranged such that it is opened with its upper end rotatably coupled to the body 20 and with its lower end capable of rocking in a direction so as to be moved away from the body 20. However, the clamshell 30 may of be course be arranged inversely arranged so that it is opened with its lower end rotatably coupled to a shaft shown by 24' in FIG. 2 and its upper end capable of rocking. With the above constructed printer, since the developing unit 5 and the cleaning unit 2 are disposed below the paper feed path, the toner is not unintentionally dropped off on the recording paper 50A/50B, thus preventing stain of the image carried on the recording paper 50A/50B.

What is claimed is:

1. A printer wherein an image is printed on a cutsheet type recording medium, which comprises:

feed means for feeding said recording medium one by one along a predetermined feed path;

image forming means disposed under said feed path for forming an image onto the undersurface of said recording medium fed by said feed means; and discharge means for discharging and stacking said recording medium with the image carrying surface down;

wherein said feed means is arranged at the upper portion of one side of said printer while said discharge means is arranged at the lower portion of the other side of said printer;

wherein said feed path linearly extends from said feed means to said discharge means with an inclination at a predetermined angle;

wherein said printer comprises a body and a clamshell rockably mounted on said body; and wherein the upper surface of said body and the lower surface of said clamshell define said feed path therebetween.

2. The printer according to claim 1, wherein said clamshell has an inclined upper surface, on which an operation panel is mounted.

3. The printer according to claim 2, wherein said upper surface of the clamshell is inclined in parallel with said feed path.

4. The printer according to claim 1, wherein said feed means comprises at least one paper holding cassette uprightly fitted to the upper portion of said one side of the printer: wherein said discharge means comprises an exhaust paper tray arranged at the lower portion of said other side of the printer; and wherein said paper holding cassette, said feed path and said discharge paper tray constitute a substantially linear inclined line.

5. The printer according to claim 1, wherein said clamshell is pivoted at its one end to said body and the other end of said clamshell is movable to be away from the body, whereby the clamshell is openable with respect to the body.

6. A printer wherein an image is electrophotographically printed on a cut-sheet type recording medium, which comprises:

feed means for feeding said recording medium one by one along a predetermined feed path;

a photoconductive drum disposed under said feed path, on the circumferential surface of which a toner image is formed;

transfer means for transferring said toner image formed on said photoconductive drum onto the undersurface of said recording medium fed by said feed means; and discharge means for discharging and stacking said recording medium with the image carrying surface down;

wherein said feed means is arranged at the upper portion of one side of said printer, while said discharge means is arranged at the lower portion of the other side of said printer;

wherein said feed path linearly extends from said feed means to said discharge means with an inclination at a predetermined angle;

wherein said printer comprises a body and a clamshell rockably mounted on said body; and wherein the upper surface of said body and the lower surface of said clamshell define said feed path therebetween.

7. The printer according to claim 6, wherein said clamshell has an inclined upper surface, on which an operation panel is mounted.

8. The printer according to claim 7, wherein said upper surface of the clamshell is inclined in parallel with said feed path.

9. The printer according to claim 6, wherein said feed means comprises at least one paper holding cassette uprightly fitted to the upper portion of said one side of the printer: wherein said exhaust means comprises an exhaust paper tray arranged at the lower portion of said other side of the printer; and wherein said paper holding cassette, said feed path and said exhaust paper tray constitutes a substantially linear inclined line.

10. The printer according to claim 6, wherein said clamshell is pivoted at its one end to said body and the other end of said clamshell is movable to be away from the body, whereby the clamshell is openable with respect to the body.

* * * * *